(12) United States Patent
He

(10) Patent No.: US 7,623,595 B1
(45) Date of Patent: Nov. 24, 2009

(54) DIGITAL TECHNIQUE OF COMPENSATING MISMATCHES BETWEEN IN PHASE AND QUADRATURE CHANNELS

(75) Inventor: Runsheng He, Sunnyvale, CA (US)

(73) Assignee: Marvell International Ltd., Hamilton (BM)

( * ) Notice: Subject to any disclaimer, the term of this patent is extended or adjusted under 35 U.S.C. 154(b) by 705 days.

(21) Appl. No.: 10/975,594

(22) Filed: Oct. 27, 2004

Related U.S. Application Data

(60) Provisional application No. 60/592,292, filed on Jul. 28, 2004.

(51) Int. Cl.
*H03D 3/00* (2006.01)
*H04L 27/00* (2006.01)
*H04B 1/10* (2006.01)

(52) U.S. Cl. .................. 375/324; 375/235; 375/322; 375/350

(58) Field of Classification Search ............. 375/232, 375/235, 324, 329, 350; 329/304, 306; 708/300, 708/322, 323
See application file for complete search history.

(56) References Cited

U.S. PATENT DOCUMENTS 6,785,529 B2 * 8/2004 Ciccarelli et al. ........... 455/324

7,024,172 B1 * 4/2006 Murphy et al. ............. 455/324
7,061,994 B2 * 6/2006 Li et al. ..................... 375/329

OTHER PUBLICATIONS

IEEE Computer Society, *"IEEE Standard for Information Technology—Telecommunications and Information Exchange Between Systems—Local and Metropolitan Area Networks—Specific Requirements—Part 3: Carrier Sense Multiple Access with Collision Detection (CSMA/CD) Access Method and Physical Layer Specifications"*, IEEE Std 802.3—2002.

* cited by examiner

*Primary Examiner*—Betsy L Deppe

(57) ABSTRACT

Methods and systems for filtering an input signal include receiving a first demodulated signal produced by multiplying a first generated signal with a received input signal, receiving a second demodulated signal produced by multiplying a second generated signal with the received input signal, and producing first and second filtered output signals by applying a transfer function to the first and second demodulated signals, wherein the transfer function comprises a first filtering coefficient, wherein the first filtering coefficient defines a matrix comprising one or more non-symmetrical terms. An application of the transfer function can compensate for one or more of an amplitude mismatch between the first and second generated signals, a phase mismatch between the first and second generated signals, and one or more frequency handling characteristics of channels used to produce the first and second demodulated signals.

38 Claims, 4 Drawing Sheets

DIGITAL TECHNIQUE OF COMPENSATING MISMATCHES BETWEEN IN PHASE AND QUADRATURE CHANNELS

CROSS-REFERENCE TO RELATED APPLICATION

This patent claims the benefit of the priority of U.S. Provisional Application Ser. No. 60/592,292, filed Jul. 28, 2004 and entitled "IQ Imbalance Compensation."

BACKGROUND

Many different kinds of communication systems, including, but not limited to, direct conversion products such as wireless system receivers, and GSM systems, transmit data using so-called Quadrature Amplitude Modulation, or QAM, over two different out-of-phase channels. These channels are conventionally referred to as the in-phase channel or "I" channel, and the quadrature phase channel or "Q" channel. In such a system, both the in-phase signal, and the 90° out of phase quadrature signal, are used to completely restore a desired signal. Any errors between the matching of the channels can affect the received signal, and hence can cause errors in the received signal.

In receivers of this type, there will always be mismatches between the components used in the I and Q channels. A filter or compensation can be used in an attempt to compensate for the mismatches.

SUMMARY

The present disclosure provides a special filter for correcting for errors caused by mismatches between I and Q channels in such a system.

An aspect defines a filter with a matching coefficient which does not have symmetrical terms.

Another aspect compensates for frequency-dependent errors in the channels.

One aspect defines a filter, that has first and second inputs adapted to receive first and second, substantially out of phase signals, which are mismatched relative to one another, and to produce first and second filtered outputs based on a filtering characteristic, wherein said filtering characteristic is of a form which includes a first filtering coefficient weighting said first and second signals, and a second filtering coefficient, weighting third and fourth signals which were produced at a different time then said first and second signals, and where said first and second filtering coefficients define matrices which have non-symmetrical terms.

The mismatch can be between said I and Q channels as a function of frequency, and the filter corrects for said frequency mismatch.

The filter can include a first local oscillator, generating cos(WcT) for one of said I and Q channels, and a second local oscillator generating sin(WCT) for the other of said I and Q channels.

The filter also includes at least one additional filtering coefficients weighting other, previously-produced signals, wherein there are a total of L different filtering coefficients, each filtering coefficient weighting a previously-produced signal.

The number L of different filtering coefficients is based on a flatness of a frequency response, with a flatter frequency response having a lower L.

The filter can be an adaptive filter that uses least mean squares operation.

According to another aspect, a method, defines receiving a signal which represents first and second out of phase components of a transmission to be received; and filtering the signal to compensate for mismatches between all of: 1) amplitude and phase differences between local oscillators in phase and quadrature components of the channel, and 2) transmission mismatches of the in phase and quadrature components of the channel as a function of frequency.

The filtering can comprise adaptively filtering the signal.

The filtering can comprises filtering the signal using a coefficient that can be expressed as a matrix with non symmetrical terms.

The receiving a signal comprises receiving a reception signal, first processing said reception signal using a first local oscillator to produce a first component, and second processing said reception signal using a second local oscillator to produce a second component which is substantially out of phase with said first component.

The first processing comprises multiplying the reception signal by cosine $W_C T$, and said second processing comprises multiplying the reception signal by sine $W_C T$.

Wherein said filter includes a plurality of filtering coefficients, each weighting a signal value, with at least a plurality of the filtering coefficients weighting previously produced signals, and where there are a total of L different filtering coefficients. A value of L can be selected, wherein said value of L is selected such that a flatter frequency response has a lower L.

Wherein said filtering comprises filtering according to a filtering characteristic of the form:

$$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix}$$

where the $H_0$, $H_1$, $H_L$ are of a form with non symmetrical terms.

Wherein $H_i$ is of the form $H(k+1)=H(k)-\mu \cdot E(k) \cdot Y(k)'$, where $\mu$ is a constant, $E(k)$ is the error signal, $Y(k)$ is an input signal, and $Y(k)'$ is a transpose of $Y(k)$.

Wherein said adaptive filter is of the form $H(k+1)=H(k)-\mu \cdot E(k) \cdot Y(k)'$, where $\mu$ is a constant, $E(k)$ is the error signal, $Y(k)$ is an input signal, and $Y(k)'$ is a transpose of $Y(k)$.

Wherein the error signal $E(k)$ is of the form $$E(k) = \begin{bmatrix} \tilde{I}(kT) - I(kT) \\ \tilde{Q}(kT) - Q(kT) \end{bmatrix}$$

where $\tilde{I}(kT)$ is the calculated I output, $I(kt)$ is the actual I output, $\tilde{Q}(kT)$ is the calculated Q output, and $Q(kT)$ is the actual Q output.

BRIEF DESCRIPTION OF THE DRAWINGS

These and other aspects will now be described in detail with reference to the accompanying drawings, wherein.

DETAILED DESCRIPTION

Figure 1:
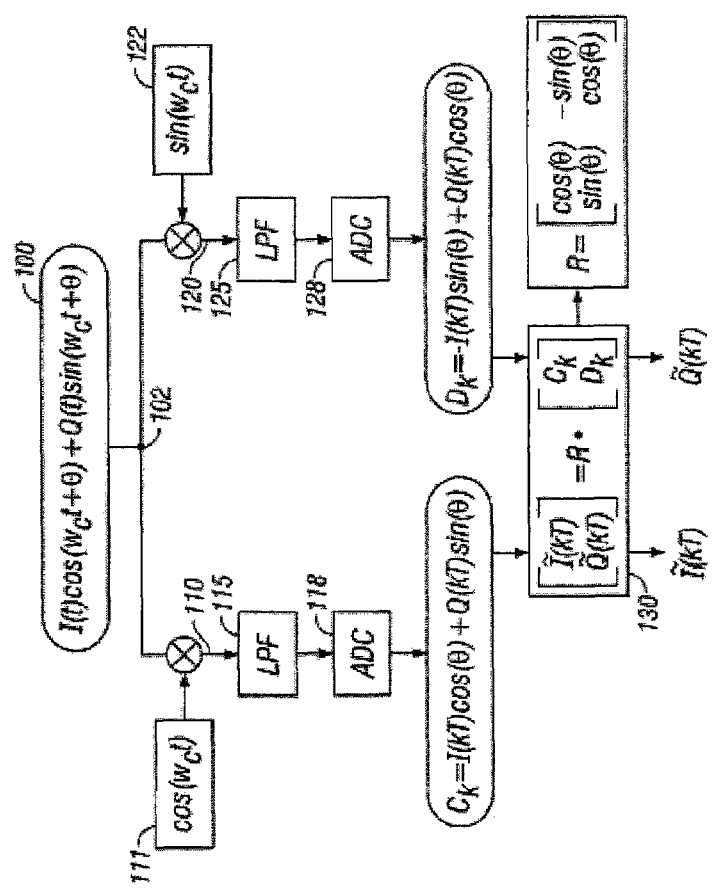
FIG. 1 shows a block diagram of an example receiver which processes I and Q signals for an ideal case that does not have mismatch between I and Q channels.

FIG. 1 shows a block diagram of a receiver which processes I and Q signals. These I and Q signals can, more generally, be any two signals which are out of phase with one another. The receiver, more generally, can receive a first reception signal, which represents the actual signal received over the channel. This reception signal shown as 100, can be represented as:

$$I(t)\cos(w_c t+\theta)+Q(t)\sin(w_c t+\theta) \quad (1)$$

A node 102 divides into two branches, a so-called in-phase or I branch 110 and a so-called out-of-phase or Q branch 120. The in-phase branch 110 is demodulated, by multiplying by $\cos(w_c t)$, produced by a first local oscillator 111, to represent the cosine portion of the signal 100. In this case, the local oscillator 111 has a frequency equal to the carrier. Analogously, the quadrature branch 120 is formed by multiplying the signal by $\sin(w_c t)$ produced by a second local oscillator 122. Each of the signals are then low pass filtered by low pass filters 115, 125, and then A/D converted by A/D converters 118, 128.

The output from the in-phase branch 110 can therefore be represented as $$C_k=I(kT)\cos(\theta)+Q(kT)\sin(\theta) \quad (2)$$

While the output from the out-of-phase branch 120 can be represented as $$D_k=-I(kT)\sin(\theta)+Q(kT)\cos(\theta) \quad (3)$$

Note that each of the signals from each of these branches includes a portion that should really be attributable to the other branch. That portion is typically filtered by a rotator filter 130. The rotator filter 130 uses the transfer function $$\begin{bmatrix} \tilde{I}(kT) \\ \tilde{Q}(kT) \end{bmatrix} = R \cdot \begin{bmatrix} C_k \\ D_k \end{bmatrix} \quad (4)$$

to produce outputs $\tilde{I}(kT)$ and $\tilde{Q}(kT)$ from the outputs $C_k$ and $D_k$ (where the represents the filtered version). The transfer function may take the form $$R = \begin{bmatrix} \cos(\theta) & -\sin(\theta) \\ \sin(\theta) & \cos(\theta) \end{bmatrix} \quad (5)$$

or more generally of the form, $e^{j\theta}$. Note that the matrix in equation (5) has symmetric terms, e.g, $\cos(\theta)$ is cross-symmetric with $\cos(\theta)$, and non-symmetric terms, e.g., $-\sin(\theta)$ is non-symmetric with $\sin(\theta)$.

Figure 2:
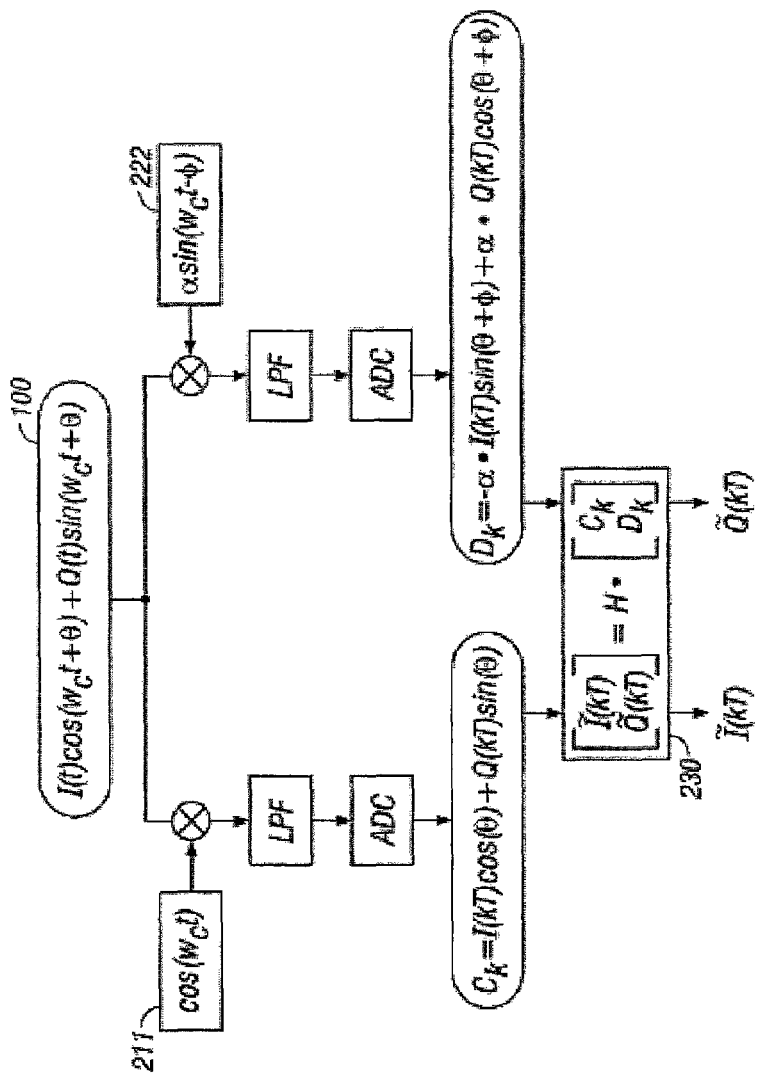
FIG. 2 shows correction of mismatch in a QAM system which takes into account phase and amplitude differences between the local oscillators.

FIG. 2 shows a more practical case which takes into account mismatches. FIG. 2 compensates for the filtering characteristics of the channel, and also for amplitude and phase mismatches between the generators 211, 222. In the FIG. 2 embodiment, the generator 211 generates $\cos(w_c t)$. However, the generator 222 is not precisely matched to the generator 211, and its output takes the form $$\alpha \sin(w_c t - \phi)$$

Where $\alpha$ represents the amplitude mismatch and $\phi$ represents a phase mismatch relative to generator 211.

The output signals in this more practical case, therefore include $$C_k=I(kT)\cos(\theta)+Q(kT)\sin(\theta) \quad (6)$$

for the in phase channel, and $$D_k=-\alpha \cdot I(kT)\sin(\theta+\phi)+\alpha \cdot Q(kT)\cos(\theta+\phi) \quad (7)$$

for the quadrature channel.

The signals are applied to a filter 230 which has the matching function $$\begin{bmatrix} \tilde{I}(kT) \\ \tilde{Q}(kT) \end{bmatrix} = H \cdot \begin{bmatrix} C_k \\ D_k \end{bmatrix} \quad (8)$$

where the filtering function H has the form $$H = \begin{bmatrix} \cos(\theta+\phi)/\cos(\theta) & -\sin(\theta)/(\alpha\cos(\theta)) \\ \sin[\theta+\phi]/\cos(\theta) & \cos(\theta)/(\alpha\cos(\theta)) \end{bmatrix} \quad (9)$$

This filtering function H does not have symmetric cross terms and hence can compensate for more general errors.

Figure 4:
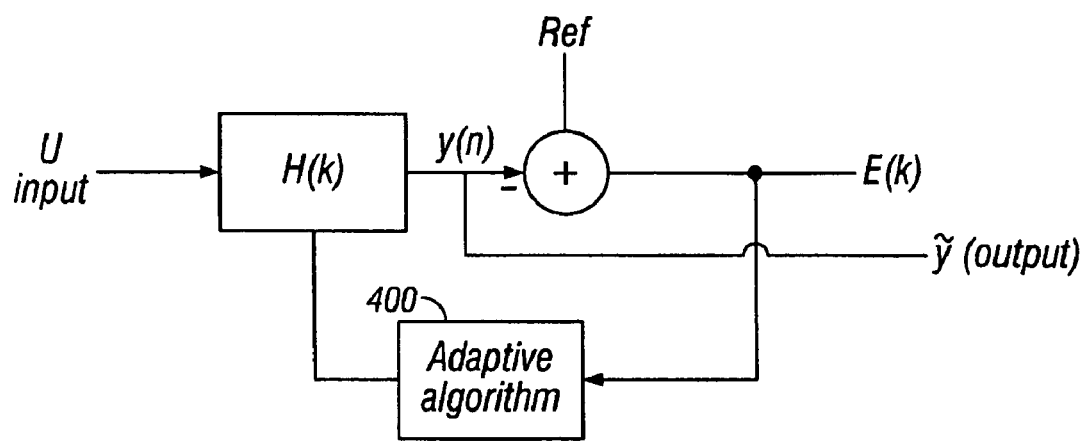
FIG. 4 shows a general adaptive filter.

In an embodiment, H can be an adaptive filter as shown in FIG. 4. The filter mathematically has the form $$H(k+1)=H(k)-\mu \cdot E(k) \cdot [C_k D_k], \text{ where}$$

$$E(k) = \begin{bmatrix} \tilde{I}(kT) - I(kT) \\ \tilde{Q}(kT) - Q(kT) \end{bmatrix} \quad (10)$$

Where $\mu$ is a constant. Error signal E(k) represents the error between the current signal Y(n) and a reference signal Ref. An adaptive algorithm 400 uses equation (10) to adapt filter coefficients H to minimize the power of the error signal E(k). Different types of adaptive filters are well-known, using, for example, a least mean squares algorithm, and other known techniques.

Figure 3:
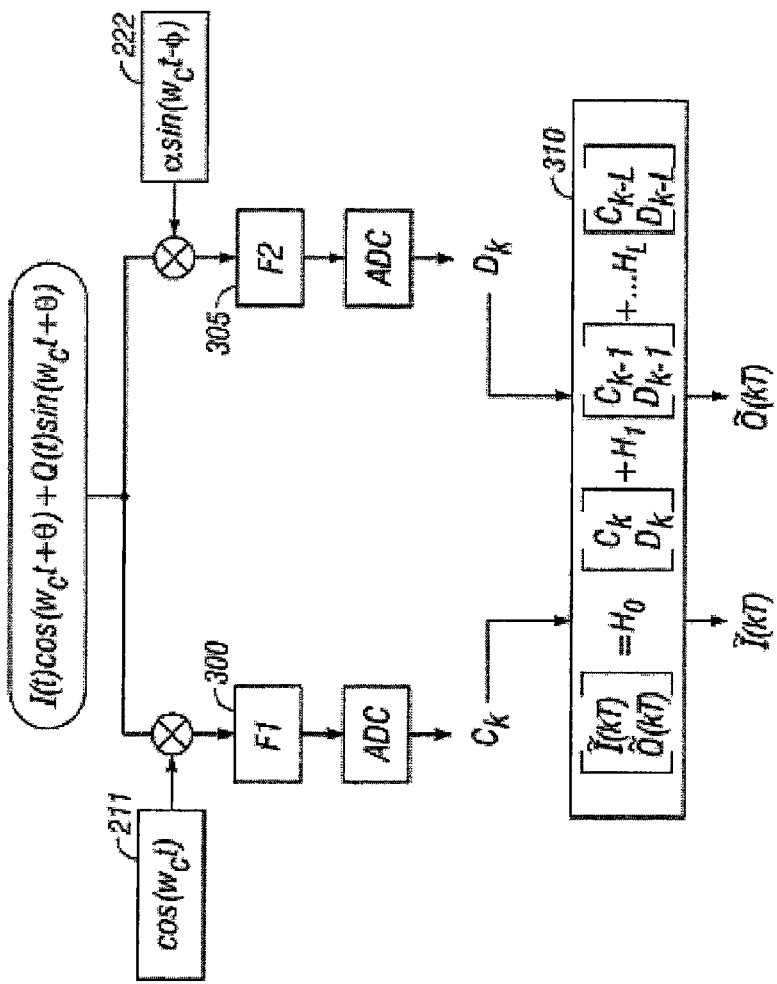
FIG. 3 shows a more general QAM mismatch system which takes into account frequency handling characteristics at various frequencies.

FIG. 3 shows an even more general matching system that compensates for mismatches not only in the channel itself, and in the generators, but also in the frequency handling characteristics between the channels. This may include, for example, the low pass filters 115, 125 in FIG. 1 as well as the characteristics of the channel at different frequencies. The mismatches between the channels are shown generically in FIG. 3 as 300, 305, where the in-phase channel has the frequency characteristic F1, and the out of phase channel has the frequency characteristic F2.

A special adaptive compensation filter 310 is used. The compensation filter has the transfer function $$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix} \quad (12)$$

in order to correct for these values. In this adaptive mismatch compensation, the $H_t$ function is a 2×2 matrix. A classic adaptive filter uses previous values and errors to form coefficients to correct the current values. This improved matching uses an adaptive system which uses multiple different previous values, here L of those values extending back in time by L time periods. L may be selected based on the flatness of the frequency for the bandwidth of interest, where a flatter frequency may have a smaller L. An exemplary value of L, for example, may be 20.

The correction value H is actually formed of an array, therefore $$H=[H_0\ H_1 \ldots H_L] \quad (13)$$

Here, where the array is of dimension $$H:2\times(2\cdot(L+1)) \quad (14)$$

the input value used by the array is of the form $$Y=[C_k, D_k, C_{k-1}, D_{k-1}, \ldots C_{k-L}, D_{k-L}]',\ \text{where}\ Y:(2\cdot(L+1))\times 1 \quad (15)$$

This adaptive filter, therefore follows the equation $$H(k+1)=H(k)-\mu\cdot E(k)\cdot Y(k)' \quad (16)$$

Where $\mu$ is a constant, $E(k)$ is the error signal, and $Y(k)'$ is the transpose of $Y(k)$. The error signal for the adaptive filter is calculated as $$E(k) = \begin{bmatrix} \tilde{I}(kT) - I(kT) \\ \tilde{Q}(kT) - Q(kT) \end{bmatrix} \quad (17)$$

An important feature of this system, is that the correction factor is not a complex number of the form $h_i = a_i + jb_i$, which would have the form $$h_i = \begin{bmatrix} a_i & -b_i \\ b_i & a_i \end{bmatrix}$$

Rather, here, the matching value does not have symmetric terms in its matrix. This more powerful correction allows the filter to correct for combinations of different mismatches within the system.

For example, the filter of this type may correct for multiple ones of phase and amplitude differences between the local oscillators, as well as frequency mismatches of channel characteristics.

The above system describes a filter which may be used in any kind of communication product. The filter can be effected in software, that is executed on a programmable processor of any type, such as a general-purpose processor, or a digital signal processor which is also carrying out some other function. The software can also be executed on a simulation system, such as MATLAB™. The filter can alternatively be effected in hardware, such as using dedicated circuitry defined using hardware definition language, or by a suitably programmed field programmable gate array or in an application specific integrated circuit.

This circuit may be used as part of any type of communication equipment, such as a cellular telephone, a network communication part such as a modem or wireless network device, or any other device that communicates data or other information, either digitally or in analog form. Most specifically, however, this may find application in an "direct conversion" type receiver that operates without a local oscillator. For example, this may be used in a CDMA, GSM or other telephone, or the like.

Although only a few embodiments have been disclosed in detail above, other modifications are possible. All such modifications are intended to be encompassed within the following claims, in which:

What is claimed is:

1. A method for filtering an input signal, the method comprising:
   receiving, at an apparatus, a first demodulated signal produced by multiplying a first generated signal with a received input signal, the first generated signal being of a form $\cos(w_c t)$ with $w_c$ being a carrier frequency;
   receiving, at the apparatus, a second demodulated signal produced by multiplying a second generated signal with the received input signal, the second generated signal being of a form $\alpha \sin(w_c t - \phi)$, wherein $\alpha$ represents an amplitude mismatch and $\phi$ represents a phase mismatch between the first and second generated signals;
   obtaining one or more groups generated from one or more previously received input signals, respectively, wherein each group comprises a first demodulated signal and a second demodulated signal, wherein each previously received input signal comprises two signals that differ in phase;
   generating a filtering coefficient for each obtained group, wherein each generated filtering coefficient comprises a matrix comprising one or more non-symmetrical terms; and
   producing first and second filtered output signals by applying a first filtering coefficient to the first and second demodulated signals, wherein the first filtering coefficient comprises a matrix comprising one or more non-symmetrical terms, wherein producing first and second filtered output signals further comprises applying the one or more generated filtering coefficients to the one or more obtained groups.

2. The method of claim 1, wherein applying the first filtering coefficient and the one or more generated filtering coefficients collectively compensates for one or more of an amplitude mismatch between the first and second generated signals, a phase mismatch between the first and second generated signals, and one or more frequency handling characteristics of channels used to produce the first and second demodulated signals.

3. The method of claim 1, wherein the obtaining of the one or more groups comprises:
   obtaining the one or more previously received input signals; and
   multiplying each of the previously received input signals by the first and second generated signals to, respectively, generate first and second demodulated signals for each of the obtained groups.

4. The method of claim 1, wherein the producing comprises:
   multiplying the first filtering coefficient with the received input signal's first and second demodulated signals and multiplying each of the one or more generated filtering coefficients with each one's respective obtained group; and
   summing over an output of each multiplication to produce the first and second filtered output signals.

5. The method of claim 1, wherein producing first and second filtered output signals further comprises using an equation of a form:

$$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix},$$

wherein $H_0$ represents the first filtering coefficient, wherein L represents the number of obtained groups, wherein $H_1, \ldots, H_L$ respectively represent the one or more generated filtering coefficients, wherein $C_k$ represents the first demodulated signal of the received input signal, wherein $D_k$ represents the second demodulated signal of the received input signal, wherein each of the $C_{k-1}, \ldots, C_{k-L}$ represents a demodulated signal of a previously received input signal demodulated by the first generated signal, wherein each of the $D_{k-1}, \ldots, D_{k-L}$ represents a demodulated signal of a previously received input signal demodulated by the second generated signal, wherein $\tilde{I}(kT)$ represents the first filtered output signal and $\tilde{Q}(kT)$ represents the second filtered output signal.

6. The method of claim 5, wherein the value of L is based on a flatness of a frequency response, with a flatter frequency response having a lower L.

7. The method of claim 5, further comprising:
using an equation of a form $H(k+1)=H(k)-\mu \cdot E(k) \cdot Y(k)'$ to produce the first filtering coefficient and the one or more generated filtering coefficients, wherein $H(k+1)$ and $H(k)$ respectively represent different filtering coefficients in an filtering coefficient array that comprises $H_0, H_1, \ldots,$ and $H_L$, wherein $\mu$ is a constant, wherein Y comprises $C_k, D_k, C_{k-1}, D_{k-1}, \ldots, C_{k-L},$ and $D_{k-L}$, wherein $Y(k)$, representing an element of Y, comprises a first demodulated signal and a second demodulated signal, $Y(k)'$ represents a transpose of $Y(k)$, and $E(k)$ represents an error, the error being a difference between filtered output signals produced by using at least a portion of Y and components of a reference signal.

8. The method of claim 7, wherein $E(k)$ is of a form $$E(k) = \begin{bmatrix} \tilde{I}(kT) - I(kT) \\ \tilde{Q}(kT) - Q(kT) \end{bmatrix},$$

$\tilde{I}(kT)$ represents a first filtered output signal, and $\tilde{Q}(kT)$ represents a second filtered output signal, wherein $I(kT)$ and $Q(kT)$ respectively represent different components of a reference signal.

9. The method of claim 1, wherein at least one of the matrices has a form $$H = \begin{bmatrix} \cos(\theta+\phi)/\cos(\theta) & -\sin(\theta)/(\alpha\cos(\theta)) \\ \sin(\theta+\phi)/\cos(\theta) & \cos(\theta)/(\alpha\cos(\theta)) \end{bmatrix},$$

$\theta$ being a constant.

10. The method of claim 1, wherein $\alpha$ equals one to indicate no amplitude mismatch.

11. The method of claim 1, wherein $\phi$ equals zero to indicate no phase mismatch.

12. The method of claim 1, further comprising:
receiving, at the apparatus, a signal that comprises the received input signal.

13. A communication system comprising:
a receiver to receive a input signal, the input signal comprising two signals that differ in phase; and
a processor communicatively coupled with the receiver, the processor configured to perform operations comprising:
receiving a first demodulated signal produced by multiplying a first generated signal with the received input signal, the first generated signal being of a form $\cos(w_c t)$ with $w_c$ being a carrier frequency;
receiving a second demodulated signal produced by multiplying a second generated signal with the received input signal, the second generated signal being of a form $\alpha \sin(w_c t-\phi)$, wherein $\alpha$ represents an amplitude mismatch and $\phi$ represents a phase mismatch between the first and second generated signals;
obtaining one or more groups generated from one or more previously received input signals, respectively, wherein each group comprises a first demodulated signal and a second demodulated signal, wherein each previously received input signal comprises two signals that differ in phase;
generating a filtering coefficient for each obtained group, wherein each generated filtering coefficient comprises a matrix comprising one or more non-symmetrical terms; and
producing first and second filtered output signals by applying a first filtering coefficient to the first and second demodulated signals, wherein the first filtering coefficient comprises a matrix comprising one or more non-symmetrical terms, wherein producing first and second filtered output signals further comprises applying the one or more generated filtering coefficients to the one or more obtained groups.

14. The system of claim 13, wherein applying the first filtering coefficient and the one or more generated filtering coefficients collectively compensates for one or more of an amplitude mismatch between the first and second generated signals, a phase mismatch between the first and second generated signals, and one or more frequency handling characteristics of channels used to produce the first and second demodulated signals.

15. The system of claim 13, wherein the obtaining of the one or more groups comprises:
obtaining the one or more previously received input signals; and
multiplying each of the previously received input signals by the first and second generated signals to, respectively, generate first and second demodulated signals for each of the obtained groups.

16. The system of claim 13, wherein the producing comprises:
multiplying the first filtering coefficient with the received input signal's first and second demodulated signals and multiplying each of the one or more generated filtering coefficients with each one's respective obtained group; and
summing over an output of each multiplication to produce the first and second filtered output signals.

17. The system of claim 13, wherein producing first and second filtered output signals further comprises using an equation of a form:

$$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix},$$

wherein $H_0$ represents the first filtering coefficient, wherein L represents the number of obtained groups, wherein $H_1, \ldots, H_L$ respectively represent the one or more generated filtering coefficients, wherein $C_k$ represents the first demodulated signal of the received input signal, wherein $D_k$ represents the second demodulated signal of the received input signal, wherein each of the $C_{k-1}, \ldots, C_{k-L}$ represents a demodulated signal of a previously received input signal demodulated by the first generated signal, wherein each of the $D_{k-1}, \ldots, D_{k-L}$ represents a demodulated signal of a previously received input signal demodulated by the second generated signal, wherein $\tilde{I}(kT)$ represents the first filtered output signal and $\tilde{Q}(kT)$ represents the second filtered output signal.

18. The system of claim 17, wherein the value of L is based on a flatness of a frequency response, with a flatter frequency response having a lower L.

19. The system of claim 17, the operations further comprising:
using an equation of a form $H(k+1)=H(k)-\mu \cdot E(k) \cdot Y(k)'$ to produce the first filtering coefficient and the one or more generated filtering coefficients, wherein H (k+1) and H(k) respectively represent different filtering coefficients in an filtering coefficient array that comprises $H_0$, $H_1, \ldots,$ and $H_L$, wherein $\mu$ is a constant, wherein Y comprises $C_k, D_k, C_{k-1}, D_{k-1}, \ldots, C_{k-L},$ and $D_{k-L}$, wherein Y(k), representing an element of Y, comprises a first demodulated signal and a second demodulated signal, Y(k) represents a transpose of Y(k), and E(k) represents an error, the error being a difference between filtered output signals produced by using at least a portion of Y and components of a reference signal.

20. The system of claim 19, wherein E(k) is of a form $$E(k) = \begin{bmatrix} \tilde{I}(kT) - I(kT) \\ \tilde{Q}(kT) - Q(kT) \end{bmatrix},$$

$\tilde{I}(kT)$ represents a first filtered output signal, and $\tilde{Q}(kT)$ represents a second filtered output signal, wherein I (kT) and Q(kT) respectively represent different components of a reference signal.

21. The system of claim 13, wherein at least one of the matrices has a form $$H = \begin{bmatrix} \cos(\theta + \phi)/\cos(\theta) & -\sin(\theta)/(\alpha\cos(\theta)) \\ \sin(\theta + \phi)/\cos(\theta) & \cos(\theta)/(\alpha\cos(\theta)) \end{bmatrix},$$

$\theta$ being a constant.

22. The system of claim 13, wherein $\alpha$ equals one to indicate no amplitude mismatch.

23. The system of claim 13, wherein $\phi$ equals zero to indicate no phase mismatch.

24. The system of claim 13, wherein the receiver produces the first demodulated signal and the second demodulated signal by direct conversion of the received input signal.

25. The system of claim 13, further comprising:
means for generating the first and second generated signals;
means for producing the first demodulated signal by using the first generated signal; and
means for producing the second demodulated signal by using the second generated signal.

26. The system of claim 13, further comprising:
a first local oscillator to produce the first generated signal;
a second local oscillator to produce the second generated signal;
a first demodulator coupled with the first local oscillator and communicatively coupled with the receiver to produce the first demodulated signal; and
a second demodulator coupled with the second local oscillator and communicatively coupled with the receiver to produce the second demodulated signal, wherein the processor is communicatively coupled with the first and second demodulators.

27. An apparatus comprising:
modulator circuitry configured to modulate a received signal; and
a filter, in communication with the modulator circuitry, configured to perform operations, the operations comprising:
receiving a first demodulated signal produced by multiplying a first generated signal with the received signal, the first generated signal being of a form $\cos(w_c t)$ with $w_c$ being a carrier frequency;
receiving a second demodulated signal produced by multiplying a second generated signal with the received signal, the second generated signal being of a form $\alpha \sin(w_c t - \phi)$, wherein $\alpha$ represents an amplitude mismatch and $\phi$ represents a phase mismatch between the first and second generated signals;
obtaining one or more groups generated from one or more previously received input signals, respectively, wherein each group comprises a first demodulated signal and a second demodulated signal, wherein each previously received input signal comprises two signals that differ in phase;
generating a filtering coefficient for each obtained group, wherein each generated filtering coefficient comprises a matrix comprising one or more non-symmetrical terms; and
producing first and second filtered output signals by applying a first filtering coefficient to the first and second demodulated signals, wherein the first filtering coefficient comprises a matrix comprising one or more non-symmetrical terms, wherein producing first and second filtered output signals further comprises applying the one or more generated filtering coefficients to the one or more obtained groups.

28. The apparatus of claim 27, wherein applying the first filtering coefficient and the one or more generated filtering coefficients collectively compensates for one or more of an amplitude mismatch between the first and second generated signals, a phase mismatch between the first and second generated signals, and one or more frequency handling characteristics of channels used to produce the first and second demodulated signals.

29. The apparatus of claim 27, wherein the obtaining of the one or more groups comprises:
obtaining the one or more previously received input signals; and
multiplying each of the previously received input signals by the first and second generated signals to, respectively, generate first and second demodulated signals for each of the obtained groups.

30. The apparatus of claim 27, wherein the producing comprises:
multiplying the first filtering coefficient with the received input signal's first and second demodulated signals and multiplying each of the one or more generated filtering coefficients with each one's respective obtained group; and
summing over an output of each multiplication to produce the first and second filtered output signals.

31. The apparatus of claim 27, wherein producing first and second filtered output signals further comprises using an equation of a form:

$$\begin{bmatrix} \tilde{I}(kT) \\ \tilde{Q}(kT) \end{bmatrix} = H_0 \begin{bmatrix} C_k \\ D_k \end{bmatrix} + H_1 \begin{bmatrix} C_{k-1} \\ D_{k-1} \end{bmatrix} + \ldots H_L \begin{bmatrix} C_{k-L} \\ D_{k-L} \end{bmatrix},$$

wherein $H_0$ represents the first filtering coefficient, wherein L represents the number of obtained groups, wherein $H_1, \ldots, H_L$ respectively represent the one or more generated filtering coefficients, wherein $C_k$ represents the first demodulated signal of the received input signal, wherein $D_k$ represents the second demodulated signal of the received input signal, wherein each of the $C_{k-1}, \ldots, C_{k-L}$ represents a demodulated signal of a previously received input signal demodulated by the first generated signal, wherein each of the $D_{k-1}, \ldots, D_{k-L}$ represents a demodulated signal of a previously received input signal demodulated by the second generated signal, wherein $\tilde{I}(kT)$ represents the first filtered output signal and $\tilde{Q}(kT)$ represents the second filtered output signal.

32. The apparatus of claim 31, wherein the value of L is based on a flatness of a frequency response, with a flatter frequency response having a lower L.

33. The apparatus of claim 31, the operations further comprising:

using an equation of a form $H(k+1)=H(k)-\mu \cdot E(k) \cdot Y(k)'$ to produce the first filtering coefficient and the one or more generated filtering coefficients, wherein $H(k+1)$ and $H(k)$ respectively represent different filtering coefficients in an filtering coefficient array that comprises $H_0, H_1, \ldots,$ and $H_L$, wherein $\mu$ is a constant, wherein Y comprises $C_k, D_k, C_{k-1}, D_{k-1}, \ldots, C_{k-L},$ and $D_{k-L}$I, wherein Y(k), representing an element of Y, comprises a first demodulated signal and a second demodulated signal, Y(k)' represents a transpose of Y(k), and E(k) represents an error, the error being a difference between filtered output signals produced by using at least a portion of Y and components of a reference signal.

34. The apparatus of claim 33, wherein E(k) is of a form $$E(k) = \begin{bmatrix} \tilde{I}(kT) - I(kT) \\ \tilde{Q}(kT) - Q(kT) \end{bmatrix},$$

$\tilde{I}(kT)$ represents a first filtered output signal, and $\tilde{Q}(kT)$ represents a second filtered output signal, wherein I(kT) and Q(kT) respectively represent different components of a reference signal.

35. The apparatus of claim 27, wherein at least one of the matrices has a form $$H = \begin{bmatrix} \cos(\theta + \phi)/\cos(\theta) & -\sin(\theta)/(\alpha\cos(\theta)) \\ \sin(\theta + \phi)/\cos(\theta) & \cos(\theta)/(\alpha\cos(\theta)) \end{bmatrix},$$

$\theta$ being a constant.

36. The apparatus of claim 27, wherein $\alpha$ equals one to indicate no amplitude mismatch.

37. The apparatus of claim 27, wherein $\phi$ equals zero to indicate no phase mismatch.

38. The apparatus of claim 27, further comprising:
a first local oscillator to produce the first generated signal; and
a second local oscillator to produce the second generated signal
wherein the modulator circuitry is configured to produce the first demodulated signal by using the first generated signal and produce the second demodulated signal by using the second generated signal.

* * * * *